Figure 3:
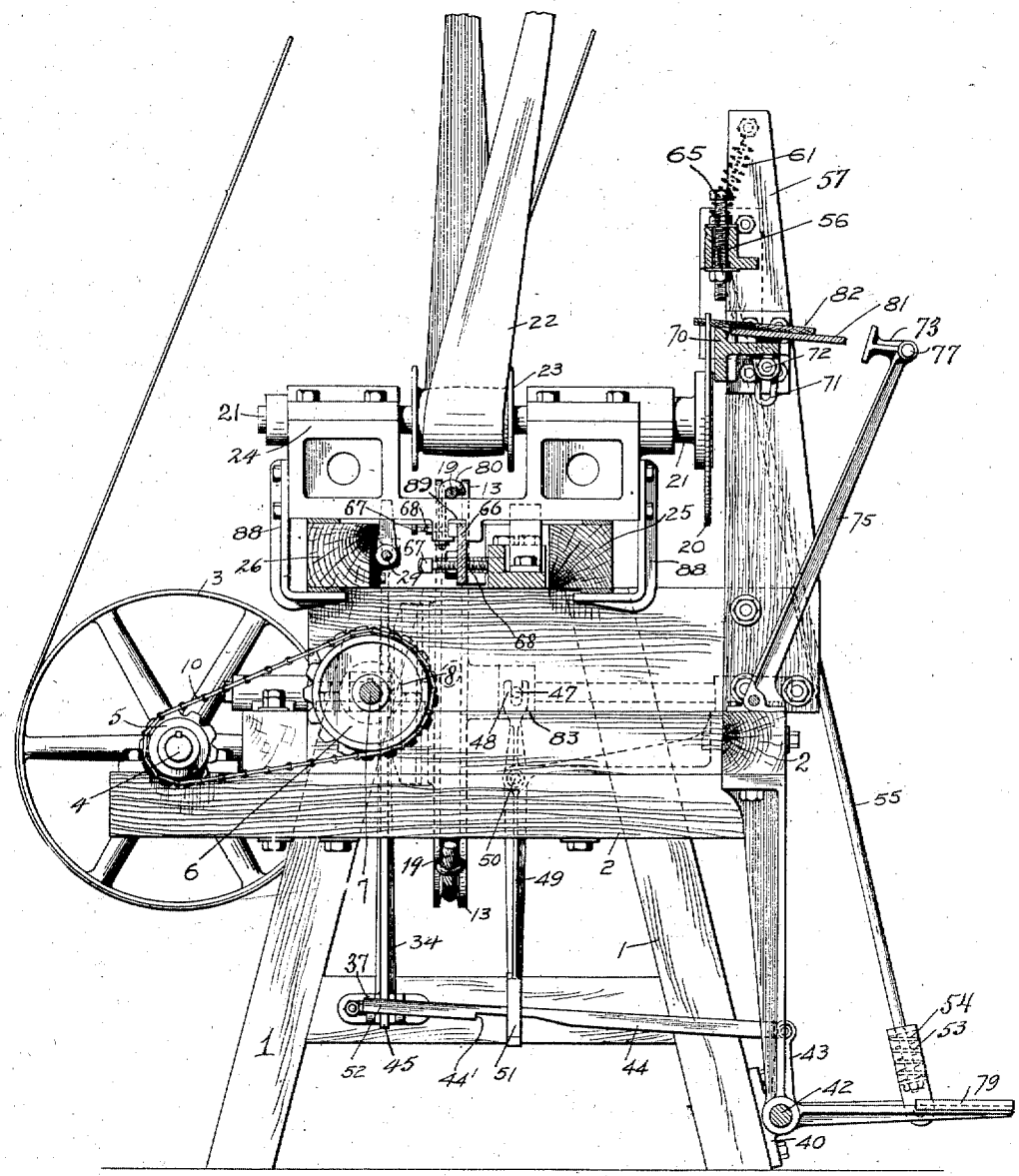

H. R. McNEILL & J. CLEMENT.
STAVE JOINTING MACHINE.
APPLICATION FILED APR. 13, 1909.
984,229.
Patented Feb. 14, 1911.
2 SHEETS—SHEET 1
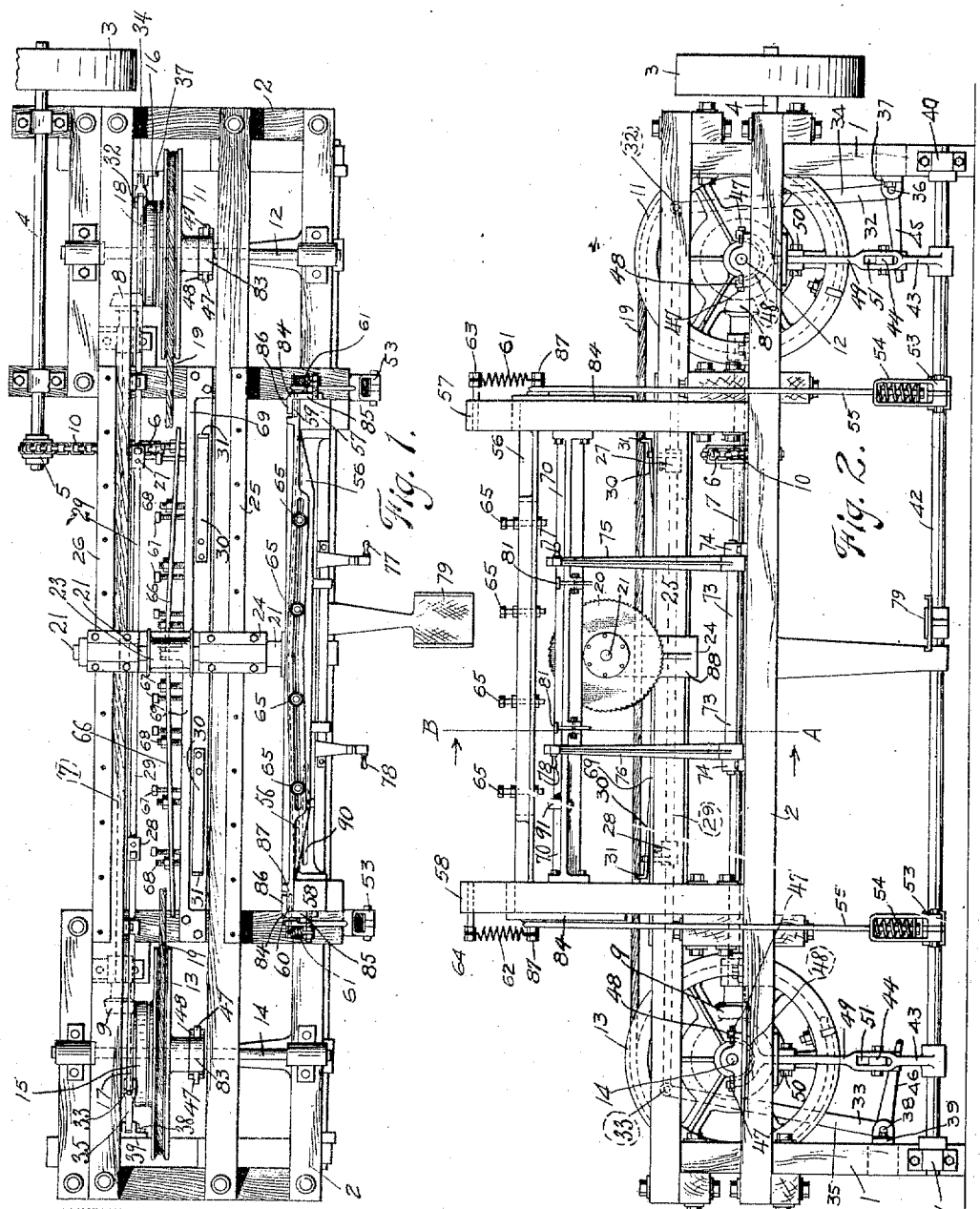
WITNESSES:
Chas. W. Stauffiger
Ethel A. Kelly
INVENTORS
Howard R. McNeill
James Clement
BY J. W. Ellis
ATTORNEY H. R. McNEILL & J. CLEMENT.
STAVE JOINTING MACHINE.
APPLICATION FILED APR. 13, 1909.

984,229.

Patented Feb. 14, 1911.

2 SHEETS—SHEET 2.

WITNESSES:
Chas. W. Stauffiger
Ethel A. Kelly

INVENTORS.
Howard R. McNeill
James Clement
BY
J. Wm. Ellis
ATTORNEY

UNITED STATES PATENT OFFICE.

HOWARD R. McNEILL AND JAMES CLEMENT, OF BUFFALO, NEW YORK; SAID CLEMENT ASSIGNOR TO SAID McNEILL.

STAVE-JOINTING MACHINE.

984,229.  Specification of Letters Patent.  Patented Feb. 14, 1911.

Application filed April 13, 1909. Serial No. 489,682.

*To all whom it may concern:*

Be it known that we, HOWARD R. Mc-NEILL and JAMES CLEMENT, citizens of the United States of America, and residents of Buffalo, in the county of Erie and State of New York, have invented certain new and useful Improvements in Stave-Jointing Machines, of which the following is a full, clear, and exact description.

Our invention relates to machines for jointing staves and by means of it staves may be prepared for tanks, vats, stills, barrels and other regularly tapered receptacles in a manner to give the desired longitudinal taper and the necessary bevel to the edges of the staves.

The operations just described performed by the machine on the stave, are performed simultaneously.

Our invention is so designed that it is adapted for properly beveling and tapering staves which may vary largely in size and the machine may be adjusted for operating on staves of various widths, lengths, thicknesses, and various degrees of taper.

Our invention contemplates the use of means for feeding staves to be jointed and holding them in position for jointing; means for jointing the staves so that they will be of tapered form and likewise means for beveling the joints at any desired angular bevel.

Our invention is simple in construction and operation and is very efficient in its action upon the staves to be jointed.

The many advantages and other objects than those above stated of our invention will appear from the following description and the novelty of the invention will be pointed out in the claims.

Referring to the accompanying drawings in which like letters of reference indicate corresponding parts in all the figures, Figure 1 is a top plan view of our invention. Fig. 2 is a side elevation of the same. Fig. 3 is a section taken on the line A—B of Fig. 2.

On the standards 1, which may be of any suitable metal or wooden construction, is mounted the frame 2.

Power for operating the machine is applied by belt or otherwise upon the power wheel 3 which is suitably journaled on one end of a shaft 4 carried by the frame 2. The shaft 4 carries at its opposite end a sprocket wheel 5 but of course it is to be understood that some other suitable means of transmitting power may be used in place of this sprocket wheel. Another sprocket wheel 6 is suitably mounted on a shaft 7 also carried by the frame 2. This shaft 7 carries at one end a bevel gear 8 and at its other end a similar bevel gear 9. A sprocket chain 10 engages with the teeth of the sprocket wheels 5 and 6 and thus power is transmitted from the power wheel 3 to the sprocket wheel 5 and thence to the sprocket wheel 6 thus rotating the shaft 7 and the bevel gears 8 and 9.

A drum 11 is loosely mounted in the frame 2 on the shaft 12 as clearly shown in Fig. 1. A second drum 13 is loosely mounted on the shaft 14 and journaled in the frame 2 at the opposite end of the machine. A friction clutch 15 is mounted on the shaft 14 and the drum 13 may be thrown into and out of contact with it by means to be hereinafter described. A corresponding friction clutch 16 is mounted on the shaft 12 and the drum 11 may be thrown into and out of engagement with it by means to be hereinafter described. The outside faces of the friction clutches 15 and 16, are provided with bevel gears 17 and 18 which mesh with the bevel gears 8 and 9 on the shaft 7 in such a manner that the friction clutches 15 and 16 are rotated in opposite directions. A cable or rope 19 has one of its ends secured on the drum 11 and its opposite end secured on the drum 13 so that it is drawn comparatively tight between these two drums.

A circular saw 20 is suitably journaled on the shaft 21. This shaft is driven by means of a belt 22 passing around a pulley 23, the latter being also carried by the said shaft 21 (see Fig. 3). This shaft 21, saw 20, and pulley 23, are carried by a longitudinally movable carriage 24 which moves on the guide-ways 25 and 26 carried by the frame 2 of the machine. To each side of the carriage 24 and extending downwardly are secured L-shaped plates 88, the shorter legs of which extend inwardly and come beneath and bear upon the under side of the guideways 25 and 26 (Fig. 3). Thus these L-shaped plates form gibs for the carriage 24 and hold same down upon the guide-ways 25 and 26. The stops 27 and 28 carried by the rod 29 limit the longitudinal travel of the carriage 24. Springs 30, having flanged ends 31 suitably secured to the plate 69, are likewise adapted to assist in limiting the travel of the carriage 24. The rod 29 is pivotally connected at one end with the arm 32 of a bell crank lever 34 and at its opposite end is pivotally connected with the arm 33 of a bell crank lever 35 (see Fig. 2). The bell crank lever 34 is fulcrumed at 36 in a bearing 37 carried by one of the standards 1. The bell crank lever 35 is fulcrumed at 38 to a suitable bearing 39 carried by another of the standards 1.

Rotatably mounted on suitable bearings 40 and 41 is a rod 42 to which are rigidly secured levers 43. Bars 44 are pivotally connected with levers 43 and placed in engagement with the arms 45 and 46 of the bell crank levers 34 and 35. The arms 45 and 46 just mentioned are so connected that when one of the arms is in its lowermost position, the other is in its uppermost position. Each of the drums 11 and 13 are provided with clutch collars 83 which carry pins 47 which are engaged by the bifurcated ends 48 of levers 49. The levers 49 are pivoted at 50 at some suitable place on the frame 2 and the lower ends of these levers are slotted at 51, through which slots the bars 44 pass. Each of the bars 44 is provided with a notch 44' so that when the inner ends 52 of the bars 44 are allowed to fall downwardly the notches 44' engage with the lower ends of the levers 49.

Suitably secured to the rod 42 are castings 53 having slots within which spiral springs 54 may be placed. Rods 55 pass through the upper parts of the castings 53 and extend beyond the lower ends of the spiral springs 54 where they are secured. The other ends of the rods 55 are pivotally mounted on the ends of the clamping frame 56 by means of the pins 87. This frame 56 is carried between the standards 57 and 58 and the angle plates 84. The angle plates 84 are secured by the legs 85 to the outside faces of the standards 57 and 58 in such a manner as to bring the other legs 86 of the angle plates 84, so that they extend inwardly or toward each other. Thus between the inner faces of the legs 86 of the angle plates 84 and one of the faces of each of the standards 57 and 58 are formed slots 59 and 60. In these slots the bearing ends of the frame 56 are adapted to have a slight vertical movement.

The legs 85 of the angle plates 84 are each provided with a vertical slot in which the pins 87 move. Preferably to the outer ends of the pins 87, which are fixed to the ends of the frame 56, are secured suitable spiral springs 61 and 62 the other ends of which are secured to bolts or other supports 63 and 64 carried by the upper ends of the standards 57 and 58. The tendency of the springs 61 and 62 is to hold the clamping frame 56 in its uppermost position. Carried by the clamping frame 56 and passing through it are a series of two or more clamping bolts 65 which extend any desired distance below the lower surface of the clamping frame, which distance is regulated by means of the nuts clearly shown in Fig. 2.

The carriage 24 which is guided in its longitudinal travel by the guide-ways 25 and 26 moves transversely on said guide-ways and its transverse movement is controlled by the guide plate 66 which is secured to the frame 2 and which passes through the slot 89 provided on the under side of the carriage 24. This guide plate is made of flexible metal through which are passed a series of adjusting bolts 67 and 68. The bolts 67 are screw-threaded through the guide plate 66 and their ends strike against the plate 69 carried by the frame 2. The bolts 68 are carried by the plate 69 and pass through the guide plate 66 and are there secured by suitable nuts. By means of this arrangement the guide plate 66 may be bent into any desired curve or kept in a substantially straight line. As shown in Fig. 1 the guide plate 66 is bent in substantially the outline of one side of a tapered stave and as the carriage 24 carrying the saw 20 travels longitudinally on its guide-ways 25 and 26 it will travel likewise transversely as it is guided in its longitudinal travel over the guide plate 66.

Carried between the standards 57 and 58 is a feeding table 70 at one end of which is a slot 90 in which a stop or gage 91 is adjustably fastened by any suitable means. The supports 71 which carry the tilting rests 81 are provided with slots through which bolts 72 pass and these bolts are clamped in place through said slots by means of nuts or in any other suitable way. The tilting rests 81 carried by the supports 71 may be adjusted so that the said rests 81 can be inclined at any desired angle. The stave 82, which is to be jointed, is placed upon the feeding table 70 and the tilting rests 81. Obviously the bevel of the edges of the staves will be determined by the angle at which the tilting rests 81 are adjusted. Below the feeding table 70 and between the standards 57 and 58 is rotatably mounted a gage 73 its bearings 74 being carried by the frame 2. The gage 73 carries the gage arms 75 and 76 at the upper ends of which are handles 77 and 78 by means of which the material to be sawed into staves may be put into its proper position relative to the saw 20 after one side of the said material has been acted upon by said saw. Rigidly secured to the rod 42 is a treadle 79 which may be depressed by the operator's foot. The bolts 65 on the clamping frame 56 are initially adjusted so that when the frame 56 is moved downwardly the bolts 65 will clamp against the stave which is to be jointed and hold it firmly in place.

Having thus described the several parts of our invention we will now describe its method of operation.

The tilting rests 81 supported by feeding table 70 are first adjusted to the angle which will make the desired bevel on the edge of the stave to be formed. The stave 82 which is to be jointed is then placed upon the tilting rests 81 and the feeding table 70. Power is applied to drive the belt 22 thus rotating the saw 20 and likewise power is applied to the power wheel 3 thus rotating the sprocket wheel 5, the sprocket wheel 6, and the shaft 7 carrying the bevel gears 8 and 9. Thereby the friction clutches 15 and 16 are oppositely revolved as previously described. The operator then presses his foot upon the treadle 79 and the first effect of that movement is to pull downwardly the rods 55 thus carrying downwardly the clamping frame 56 so that the bolts 65 clamp the stave 82 in proper position for being acted upon by the saw 20. A further depression of the treadle 79 causes the levers 43 to be moved so that the notch 44' in one of the bars 44 comes in engagement with the lower end of the lever 49. By this engagement the lever 49 is rotated on its fulcrum 50 so that its bifurcated end 48 engaging with the pins 47 throws one of the drums 11 or 13 in contact with one of the friction clutches 15 or 16. The bevel gears 8 and 9 being constantly in mesh with the bevel gears 17 and 18 of the friction clutches 15 and 16 whether these clutches are in contact with the drums 11 and 13 or not, it will be evident that when one of the drums is thrown into contact with one of the friction clutches that drum will thereby be rotated.

As previously stated, when one of the arms 45 or 46 of the bell crank levers 34 or 35 is in its lowermost position the other arm necessarily is in its uppermost position. Therefore, when the treadle 79 is depressed sufficiently to throw the notch 44' of one of the bars 44 in contact with the lower end of the lever 49 the other corresponding notch of the similar lever will be raised sufficiently high so that it will not engage with the lower end of the other lever 49. The result, therefore, of this depression of the treadle 79 will be to throw one of the drums 11 or 13 into engagement with only one of the friction clutches 15 or 16.

Assuming that the operation just described will throw the drum 11 into contact with the friction clutch 16 this drum will be rotated so that the cable or rope 19 being secured at 80 to the carriage 24 will draw the carriage 24 longitudinally to the right of Figs. 1 and 2. The carriage 24 having both a longitudinal and transverse movement as already explained will move on the guide-ways 25 and 26 longitudinally and likewise transversely by reason of the guiding action of the guide plate 66. The saw 20 being carried by the carriage 24 will therefore not only bevel the edge of the stave but will likewise taper it in the conformation determined by the shape of the guide plate 66. When the carriage 24 strikes the stop 27 it will thereby throw the rod 29, to which it is secured to the right. This will throw the bell crank lever 34 so that its arm 45 is in its uppermost position and simultaneously the bell crank lever 35 will be thrown so that its arm 46 is in its lowermost position. The result of this operation will be to raise the end 52 of the bar 44 which is at the right of the machine and throw its notch 44' out of engagement with the lower end of the lever 49, thereby throwing the drum 11 out of contact with the friction clutch 16 and thus stopping the rightwise travel of the carriage 24; at the same time the end 52 of the bar 44, which is at the left of the machine, is lowered so that it rests upon the bottom of the slot 51 of the lever 49 and is in a position to have the notch 44' fall into engagement with the lower arm of the lever 49 when the treadle 79 is released from the pressure of the operator's foot.

When the carriage 24 has reached its maximum right hand travel the treadle 79 is released, which allows the clamping frame 56 to rise, thus releasing the stave which may be reversed and put into position to have the other side operated upon by the saw 20. When the stave has been reversed and placed against the stop or gage 90 the treadle 79 is again depressed which again clamps the stave upon the feeding table 70 and the tilting rests 81. A further depression of the treadle 79 causes the notch 44' in the bar 44 which is at the left of the machine to rotate the lever 49 on its fulcrum 50, thus throwing the bifurcated end 48 of the lever against the pins 47 which are secured to the clutch collar 83 so that the drum 13 is thereby frictionally engaged with the clutch 15. The drum 13 is then revolved so that the cable or rope 19 is drawn around it and the carriage 24 is thus drawn to the left of Figs. 1 and 2. The leftwise travel of the carriage 24 both longitudinally and transversely is identical with its opposite travel as previously described. Thus it will be understood that there is no idle return stroke, but that the saw 20 is made to operate upon the stave when the carriage 24 travels from left to right or from right to left. The saw 20 of course runs constantly in the same direction of rotation, the only difference being that the sawdust is thrown downwardly when the carriage travels in one direction and when traveling in the opposite direction the sawdust is thrown upwardly. Should the momentum of the travel of the carriage 24 to the right or left of the machine be sufficient to carry it beyond the stops 27 or 28 the carriage will be stopped by the flanged ends 31 of the springs 30. When the carriage has reached the limit of its leftwise travel it strikes the stop 28 which thus reverses the positions of the bell crank levers 34 and 35 and puts the bars 44 in position to throw the drum 11 in engagement with its friction clutch 16 when the treadle 79 is again depressed.

By means of the mechanism operated as described it will be evident that staves of any desired bevel, width, length, thickness and taper can be easily, cheaply and quickly jointed in our machine. Manifestly it is not necessary to drive the friction clutches 15 and 16 by the specific means herein shown and described. Instead of using the sprocket wheels 5 and 6 and the bevel gears 8 and 9 together with the beveled faces 17 and 18 power can be directly applied to shafts 12 and 14 and identically the same results be thereby accomplished. It is therefore to be understood that the embodiment of our invention as herein shown and described only shows its preferable construction and we do not wish to be confined to the exact details of construction herein shown, since it will be evident to those skilled in the art that various modifications of these details can be made without departing from the spirit of the invention.

Having thus described our invention what we claim is:

1. A stave jointing machine comprising a traveling pattern guided saw carriage, a table for the stave, a clamp bar for clamping the stave to the table, power driven means for reciprocating said saw carriage, a treadle, means operated by said treadle for controlling the movement of said carriage in either direction, said saw engaging the work during its travel in both directions and means operated by each depression of said treadle for bringing said clamp bar down upon the stave.

2. A stave jointing machine comprising a saw carriage, a frame, a flexible plate, secured to said frame for transversely guiding the travel of said saw carriage, means for slidably connecting said flexible plate with said saw carriage, a table for the stave, a clamp bar for clamping the stave to the table, power driven means for reciprocating said saw carriage, a treadle, means operated by said treadle for controlling the movement of said carriage in either direction, said saw engaging the work during its travel in both directions, and means operated by each depression of said treadle for bringing said clamp bar down upon the stave.

3. A stave jointing machine comprising a saw carriage, a frame, a flexible plate secured to said frame for transversely guiding the travel of said saw carriage, adjustable means for changing the shape of said plate, means for slidably connecting said flexible plate with said saw carriage, a table for the stave, a clamp bar for clamping the stave to the table, power driven means for reciprocating said saw carriage, a treadle, means operated by said treadle for controlling the movement of said carriage in either direction, said saw engaging the work during its travel in both directions, and means operated by each depression of said treadle for bringing said clamp bar down upon the stave.

4. A stave jointing machine comprising a frame, a traveling pattern guided saw carriage, guideways carried by said frame, a table for the stave, a clamp bar for clamping the stave to the table, power driven means for reciprocating said saw carriage on said guideways, a treadle, means operated by said treadle for controlling the movement of said carriage in either direction, said saw engaging the work during its travel in both directions and means operated by each depression of said treadle for bringing said clamp bar down upon the stave.

5. A stave jointing machine comprising a saw carriage, a frame, guideways carried by said frame, a flexible plate secured to said frame for transversely guiding the travel of said saw carriage on said guideways, means for slidably connecting said flexible plate with said saw carriage, a table for the stave, a clamp bar for clamping the stave to the table, power driven means for reciprocating said saw carriage, a treadle and means operated by said treadle for controlling the movement of said carriage in either direction, said saw engaging the work during its travel in both directions, and means operated by each depression of said treadle for bringing said clamp bar down upon the stave.

6. A stave jointing machine comprising a rotating saw, a traveling-pattern-guided saw carriage carrying said saw, a flat horizontal table for the stave, means for imparting a tilting adjustment to the table, power driven means for reciprocating said saw carriage and means for clamping the stave to said flat horizontal table while it is being operated upon by said saw comprising a vertically movable clamp bar, and means for guiding the vertical travel of said clamp bar.

7. A stave jointing machine comprising a frame, guideways, a saw carriage having L-shaped plates spaced from and having legs engaging the underside of the guideways, and a slot on the underside of the carriage, a frame plate secured to the frame a flexible guide plate, a series of adjusting bolts screw-threaded through the guide plate and bearing against the frame plate, a series of adjusting bolts carried by the frame plate and passing through the guide plate and means for reciprocating the saw carriage.

In testimony whereof, we have hereunto set our hands in the presence of two witnesses.

HOWARD R. McNEILL.
JAMES CLEMENT.

Witnesses:
ETHEL A. KELLY,
J. WM. ELLIS.